(12) United States Patent
Stuckey

(10) Patent No.: US 11,160,293 B1
(45) Date of Patent: Nov. 2, 2021

(54) CENTRIFUGAL ICE CREAM FREEZER AND METHOD OF USE

(71) Applicant: Joshua D. Stuckey, East Earl, PA (US)

(72) Inventor: Joshua D. Stuckey, East Earl, PA (US)

(*) Notice: Subject to any disclaimer, the term of this patent is extended or adjusted under 35 U.S.C. 154(b) by 304 days.

(21) Appl. No.: 16/577,179

(22) Filed: Sep. 20, 2019

Related U.S. Application Data

(60) Provisional application No. 62/734,617, filed on Sep. 21, 2018.

(51) Int. Cl.
*A23G 9/10* (2006.01)
*A23G 9/22* (2006.01)

(52) U.S. Cl.
CPC ............... *A23G 9/10* (2013.01); *A23G 9/224* (2013.01)

(58) Field of Classification Search
CPC ... A23G 9/10; A23G 9/12; A23G 9/22; A23G 9/28; A23G 9/224; A23G 9/228; A23G 9/245
See application file for complete search history.

(56) References Cited

U.S. PATENT DOCUMENTS

| | | | |
|---|---|---|---|
| 388,925 A | 9/1888 | Spornhauer | |
| 590,445 A | 9/1897 | Woerner, Sr. | |
| 655,387 A | 8/1900 | Anderson | |
| 753,622 A | 3/1904 | Perkins | |
| 3,811,494 A * | 5/1974 | Menzel | A23G 9/04 165/65 |
| 3,921,415 A | 11/1975 | Kattis | |
| 3,952,538 A | 4/1976 | Warlick | |
| 4,169,359 A | 10/1979 | Weerstra | |
| 4,392,361 A * | 7/1983 | Cavalli | B01F 7/18 62/343 |
| 4,563,880 A * | 1/1986 | Cipelletti | A23G 9/30 62/155 |
| 4,664,529 A * | 5/1987 | Cavalli | A23G 9/12 366/144 |
| 4,796,440 A * | 1/1989 | Shiotani | A23G 9/12 222/227 |
| 5,199,278 A * | 4/1993 | Cocchi | A23G 9/086 366/149 |
| 6,041,614 A * | 3/2000 | Yamaya | A23G 9/12 165/61 |
| 6,098,418 A | 8/2000 | Kyees | |

(Continued)

FOREIGN PATENT DOCUMENTS

| DE | 559532 C | 9/1932 |
|---|---|---|
| DE | 870423 C | 3/1953 |

(Continued)

*Primary Examiner* — Emmanuele E Duke
(74) *Attorney, Agent, or Firm* — Patent Law Associates

(57) ABSTRACT

An ice cream making apparatus for chilling a solution with a freezer bowl having a great thermal capacity and being formed from a material that is thermally conductive. The freezer bowl has an interior surface that is generally radially symmetric and forms a container to hold the solution. A drive mechanism is included for rotating the solution at a rate sufficient to centrifugally disperse the solution onto a dynamic contact area of the interior surface. The interior surface having a contour that gives the solution a thin layer when centrifugally dispersed, the thin layer having an average thickness less than 1.5 cm to increase the rate of heat transfer from the solution to the freezer bowl.

20 Claims, 4 Drawing Sheets

(56) References Cited

U.S. PATENT DOCUMENTS

| | | | | |
|---|---|---|---|---|
| 6,250,794 B1* | 6/2001 | Huang | .................... | A23G 9/12 |
| | | | | 366/149 |
| 6,332,333 B1* | 12/2001 | Lee | ......................... | A23G 9/12 |
| | | | | 366/310 |
| 7,878,021 B2* | 2/2011 | Perrier | .................... | A23G 9/12 |
| | | | | 62/342 |
| 2006/0263490 A1* | 11/2006 | Wall | ........................ | A23G 9/20 |
| | | | | 426/101 |
| 2010/0175565 A1* | 7/2010 | Jejcic | .................... | A23G 9/281 |
| | | | | 99/455 |
| 2012/0092953 A1* | 4/2012 | Fung | ........................ | B01F 7/32 |
| | | | | 366/343 |
| 2014/0318172 A1* | 10/2014 | Esarey | .................. | B65D 85/78 |
| | | | | 62/342 |
| 2015/0296831 A1* | 10/2015 | Noth | ...................... | A23G 9/287 |
| | | | | 141/11 |
| 2017/0042179 A1* | 2/2017 | Thomas | .............. | B01F 7/00141 |
| 2017/0188600 A1* | 7/2017 | Semo Scharfman | .... | A23G 9/22 |
| 2017/0360060 A1* | 12/2017 | De' Longhi | ............. | A23G 9/22 |
| 2018/0020693 A1* | 1/2018 | Katz | ...................... | A23G 9/224 |
| | | | | 426/474 |
| 2018/0077949 A1* | 3/2018 | Lai | ......................... | A23G 9/245 |

FOREIGN PATENT DOCUMENTS

| | | | |
|---|---|---|---|
| FR | 416485 A | 10/1910 | |
| FR | 1516840 A | 2/1968 | |
| GB | 1352950 A | 5/1974 | |

\* cited by examiner

CENTRIFUGAL ICE CREAM FREEZER AND METHOD OF USE

CROSS-REFERENCE TO RELATED APPLICATIONS

This application claims the benefit of priority of U.S. Provisional Application 62/734,617, filed Sep. 21, 2018.

FIELD OF THE INVENTION

The present invention relates to a machine for making ice cream products for home and professional use. More specifically, this invention relates to a machine for making ice cream and the like, in a short time and of exceptional quality, especially for home use and consumption. Furthermore, the invention also relates to a method of making ice cream with the improved machine.

BACKGROUND OF THE INVENTION

Many different ice cream making machines exist to freeze an ice cream mix into a finished frozen dessert. The industrial machine used by many large ice cream producers is the continuous ice cream freezer, where the ice cream mix is chilled, aerated and mixed all while it is flowing through the machine. One of the ways that this ice cream freezer creates such good quality ice cream is that the ice cream mix freezes from a liquid to a semi-solid very quickly and thereby keeps the ice crystal size very small. This helps in making it taste smooth and creamy even with lower fat content.

The type of machine used in smaller ice cream shops and in homes is called a batch freezer because it only creates one "batch" at a time. Batch freezers can also create high quality ice cream when taking longer to freeze by using higher quality ingredients. One key differentiator in style of batch freezer is the orientation of the freezing chamber; either horizontal or vertical. Vertical freezing chambers are used in home use ice cream freezers because of their simplicity and ease of cleaning. However, the disadvantage of a vertical freezing chamber is that only a portion of the available freezing surface is utilized during the freezing process. Often only 50% of the available freezing surface is utilized to freeze the mix at the beginning of the process. This is a result of the freezer being sized to accommodate the increase in volume when the mix takes on air, called overrun. In other words, the difference in ice cream mix volume and total freezer volume is needed to prevent spilling out the freezing chamber. A horizontal batch freezer utilizes 100% of the freezing surface to chill the ice cream mix but is complicated by seals and caps that are necessary to prevent the ice cream mix from coming out of the horizontally oriented cylinder of the machine. Because of this, horizontal batch freezers freeze the ice cream mix more quickly and efficiently.

U.S. application Ser. No. 15/547,279 describes a small batch type freezer that quickly makes a small portion of ice cream. It does that by spinning a small volume of solution at an increased rate within a cup, causing greater agitation and thereby repeatedly bring more of the mix into contact with the cold surface of the vessel wall as a means to improve heat transfer from the mix. That method could increase the speed of production simply by decreasing the ice cream mix volume and increasing the agitation, but it can only be done through the use of very cold cooling solution around the freezing chamber, achievable only with industrial cooling machinery. It also does not simplify the device, which cannot be easily disassembled or cleaned. Having the same drawbacks of the horizontal batch freezer, the noted improvements are limited to simply making a small quantity on demand.

U.S. Pat. No. 7,878,021 describes a home use ice cream maker that simplifies the device to make a small batch of ice cream and even offers the mixing blade to eat from. While the simplicity of the device is noted, the quality of the ice cream is once again slow and of lesser quality than can be achieved using other methods.

It can easily be understood that a device that combines the simplicity of a home use ice cream maker and the speed and quality of a commercial ice cream maker would be a great improvement over existing devices. It can also be conceived that significant improvements could be made if a batch ice cream freezer could keep a vertical freezing chamber while also utilizing the full available surface area of the freezing chamber like what is done in a horizontal ice cream freezer.

SUMMARY OF THE INVENTION

Accordingly, the present invention, in any of the embodiments described herein, may provide one or more of the following advantages. One embodiment of the present invention is an ice cream freezer for chilling an ice cream mix with a freezer bowl containing a heat sink material. The freezer includes a motor for rotating the freezer bowl and centrifugally dispersing the solution on the interior surface of the freezer bowl. The interior surface has a dynamic contact area that is defined by the area that is contacted when the solution is being centrifugally dispersed. The dynamic contact area is substantially different from the freezer bowl surface area that is contacted when the ice cream mix is at rest. The interior surface of the freezer bowl further has a contour that gives the solution a thin layer when centrifugally dispersed. The thin layer could be defined as the average ice cream mix depth after it is centrifugally dispersed. When the value of the total volume of the ice cream mix divided by the dynamic contact area is 1.5 cm or less the ice cream freezer is achieving an average thickness that is not found on other known ice cream makers. This high surface area to volume is increases the rate of heat transfer from the solution to the freezer bowl to rates greater than those achieved by conventional means.

Similarly, in an alternative embodiment of the present invention is an ice cream freezer for chilling an ice cream mix with a freezer bowl containing a heat sink material. The freezer includes a scraper for rotating within the freezer bowl and centrifugally dispersing the solution on the interior surface of the freezer bowl. The interior surface has a dynamic contact area that is defined by the area that is contacted when the solution is being centrifugally dispersed. The dynamic contact area is substantially different from the freezer bowl surface area in contact with the solution when the ice cream mix is at rest. The interior surface of the freezer bowl further has a contour that causes the solution to achieve a thin layer when centrifugally dispersed. The thin layer could be defined as the average ice cream mix depth after it is centrifugally dispersed. When the value of the total volume of the ice cream mix divided by the dynamic contact area is 1.5 cm or less the ice cream freezer is achieving an average thickness that is not found on any other known ice cream maker.

In one aspect of the invention, the spinning ice cream mix can be induced by a mixing paddle or by the bowl itself spinning. In either case, the ice cream mix is centrifugally dispersed onto the sides of the freezer bowl and is utilizing nearly 100% of the surface of the freezer bowl. In one aspect of the invention, the ice cream mix can touch 4 times more surface of the freezer bowl when being dispersed compared to being at rest. The increase in surface contact can be 50% up to as much as 10 times more surface area depending on the shape of the freezer bowl and the contour of the walls. Increasing the surface contact with the freezer bowl has the obvious advantage that the heat transfer is increased. Furthermore, as the mixture takes on air and increases in volume, the space can be utilized toward the center of the bowl, which does not require additional height to prevent spilling. As the mixture takes on air it also is freezing and hardening further decreasing the mixture's likelihood of splashing out of the bowl.

In one embodiment of the present invention, the freezer bowl of the ice cream freezer has an interior surface contour that approximately matches the shape of the spinning ice cream mix. When fluid is spun it follows a parabolic constant determined by the speed of rotation and takes on a reasonably predictable parabolic shape. If the interior wall of the ice cream maker closely matches that parabolic shape, then an increased surface to volume ratio can be achieved while still allowing for a simple and effective scraping of the frozen mix from the wall. As a result, the present invention greatly increases the overall heat transferred from the ice cream mix and results in a finished ice cream product in a fast time, thereby having small ice crystals and a smooth, creamy product.

In one embodiment of the present invention the ice cream maker scraper is disconnected from the ice cream maker and is held by the user to scrape and churn the ice cream mixture by hand. Due to the speed and ease with which a user can manually scrape the ice cream, it can be advantageous to give more freedom for when and how the ice cream is scraped. Furthermore, the scraper not being in contact with the freezer walls can decrease the friction, and therefore heat, that is imparted to the freezer walls. The ice cream scraper could be adapted to match the shape and contour of the freezer bowl when held above the ice cream maker.

In another embodiment of the present invention the scraper could be fixed to the ice cream maker body and positioned to scrape the mixture from the side walls of the freezer bowl as it rotates. This embodiment would have the drawback that there would be an increase in friction, but it would also add the ease of not requiring the user to physically interact with the product as it is making ice cream. Yet another embodiment of the present invention could have a fixed but actuating scraper that would more closely match the action that manual scraper would provide with the ease of automation.

In another embodiment of the present invention the scraper would be the mixing paddle for the ice cream maker and the freezer bowl would be fixed in a stationary position. This embodiment would have the added benefit of a fixed bowl having the ability to utilize a heat pump condenser for even faster freezing and increased production volume. In this embodiment, the scraper can be rotated and set in vertical position or could be actuated up and down to limit the amount of friction that is being imparted to the freezer bowl. As the scraper/mixer is actuated upward it will centrifugally disperse the mixture outward and onto to the freezer bowl and as it comes down will both scrape the walls and centrifugally disperse the mixture at the same time. Furthermore, the scraper/mixer could be designed to push the mixture downward to counteract the upward direction of the centrifugally dispersed mixture, thereby increasing the movement and agitation of the mixture. A simple spiral shape would be one to move the ice cream mixture as the scraper/mixer is rotated.

One embodiment of the present invention relates to the method of creating ice cream, or the like, with the ice cream maker previously described. The method of the making ice cream would start by adding a solution to an ice cream maker and then centrifuging the mixture onto the freezer bowl walls. The mixture would then be scraped from the freezer side walls, perhaps intermittently, until the ice cream mixture has depressed in temperature and aerated into an ice crystal mixture. Finally, the ice cream is removed from the ice cream maker for consumption.

Naturally, it is understood that many of the known variations among ice cream production can be employed in the present invention. For example, the method of cooling could be with ice, from an evaporating coil or a double walled freezer bowl that contains a solution that freezes below 0 degrees C. so as to aid in the freezing of the mixture. Many of the manufacturing materials are also interchangeable such as the freezer bowl itself may be made of a wide variety of materials to act as a heat sink, however, the highly heat conductive metals being preferential to the chilling process. Many other intricacies of ice cream production currently exist and many more are yet to be invented, all of such devices and methods could apply to the invention described herein.

BRIEF DESCRIPTION OF THE DRAWINGS

The advantages of this invention will be apparent upon consideration of the following detailed disclosure of the invention, especially when taken in conjunction with the accompanying drawings wherein.

DETAILED DESCRIPTION

Figure 1:
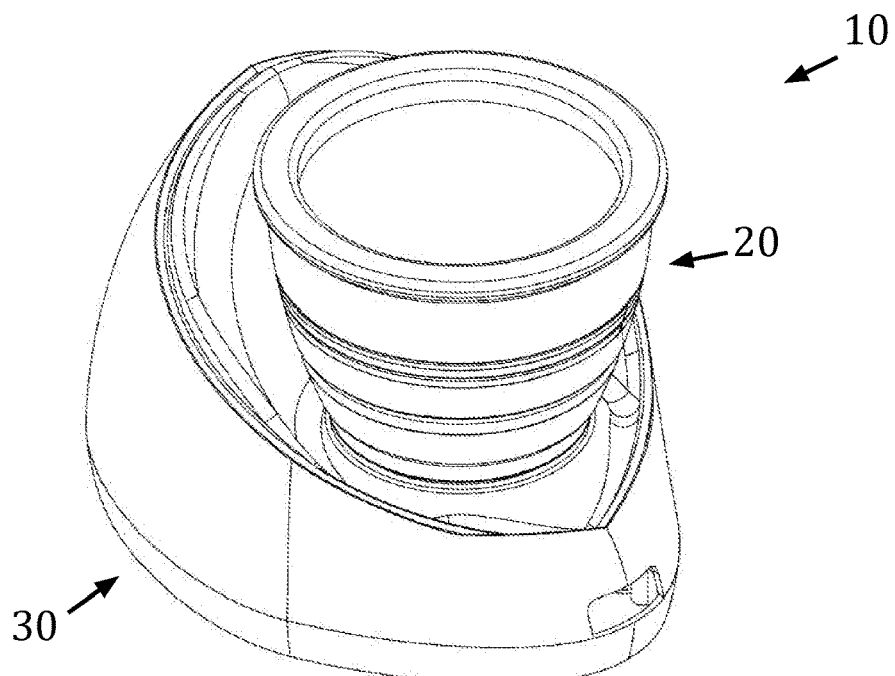
FIG. 1 is a first embodiment of an ice cream freezer incorporating the principles of the present invention.
Figure 2:
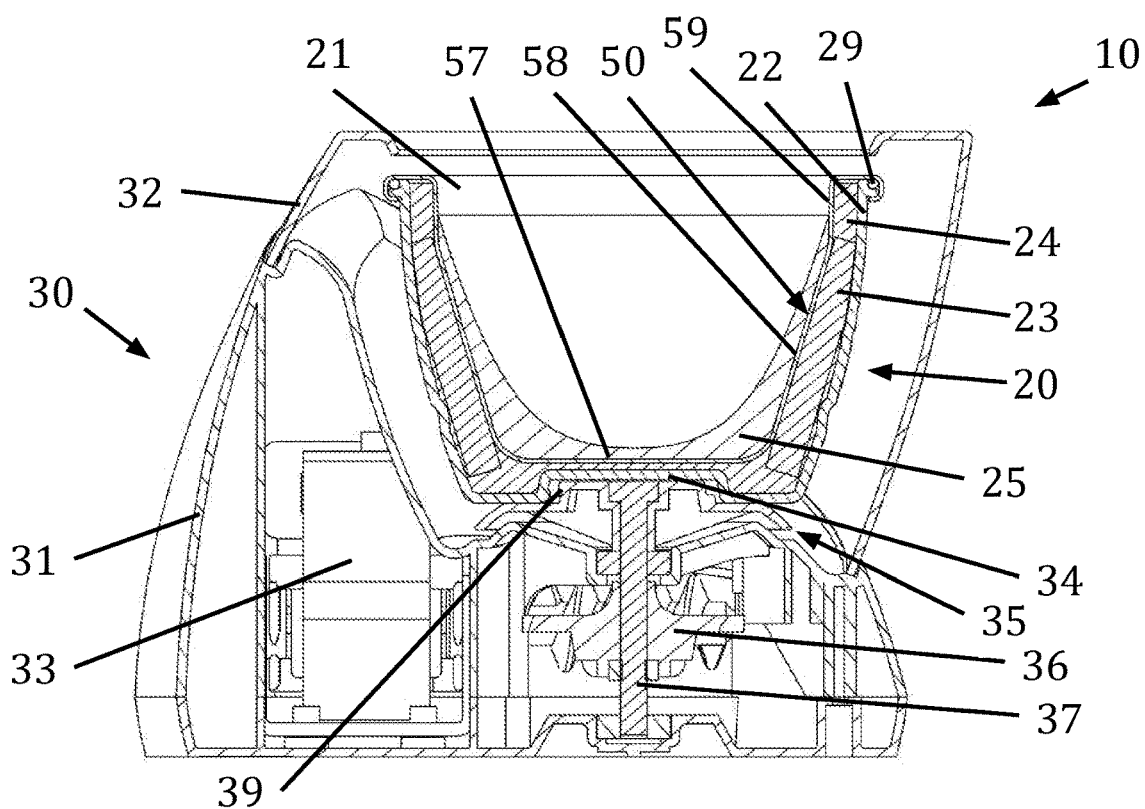
FIG. 2 is a vertical section view of the ice cream freezer previously shown in FIG. 1.

Many of the fastening, connection, processes and other means and components utilized in this invention are widely known and used in the field of the invention described, and their exact nature or type is not necessary for an understanding and use of the invention by a person skilled in the art, and they will not therefore be discussed in significant detail. Also, any reference herein to the terms "up" or "down," or "top" or "bottom" are used as a matter of mere convenience and are determined as the system would normally rest on a level surface. Furthermore, the various components shown or described herein for any specific application of this invention can be varied or altered as anticipated by this invention and the practice of a specific application of any element may already be widely known or used in the art by persons skilled in the art and each will likewise not therefore be discussed in significant detail. When referring to the figures, like parts are numbered the same in all figures.

An ice cream maker 10 is shown in FIGS. 1 through 4 comprising a freezer bowl 20 and a body 30. Freezer bowl 20 is a thermally conductive heatsink with interior surface 50. Freezer bowl 20 has a thermal capacity greater than that required to chill the solution 25 to a desired freezing temperature. The ice cream mix or solution 25 is shown in a centrifugally dispersed condition thereby increasing the rate of heat transfer out of the solution and into the heatsink. The freezer bowl 20 may include an exterior wall 22 and a seal 29 between the exterior wall 22 and the heatsink material 21 to house a phase changing solution 24 to increase the cooling capacity of the freezer bowl 20. The phase changing solution 24 would melt at a temperature at least slightly below 0 deg. C. but more ideally −5 deg C. or less. The freezer bowl 20 may also include a means of further improving the heat transfer from the solution 24 to the phase changing solution 24 with the use of fins 23. It is disclosed that the fins could be added from a separate part such as a corrugated aluminum sheet or could be integrated into the shape of the heat sink material 21 by making by use of machining or die casting. While the phase changing solution 24 is beneficial for simplicity, it is understood that any number of cooling mediums could be used to transfer the heat from the solution 25. Another such option could be an evaporator/condenser system or the heatsink material 21 could have enough thermal capacity to freeze the solution 25. The key beings that the freezer bowl 20 has more thermal capacity than what is required to freeze the volume of solution 25

In the embodiments shown in FIGS. 1 through 6, the body 30 is primarily aesthetic and may provide a cover 32 which acts to prevent spilling of an overfilled freezer bowl 20 and further acts as a place for the user to rest their hand when churning the solution 25. Body 30 also has a housing 31 that holds the drive motor 33. The drive motor 33 in combination with a drive mechanism rotates the freezer bowl 20. The drive mechanism, as disclosed in this embodiment is made up of a mounting plate 35, a drive shaft 37, a drive gear 36 and worm gear 38 to rotate the freezer bowl 20. While a conventional worm gear drive mechanism is illustrated, it is understood that any number of drive mechanisms could be employed. It is also foreseeable to use a low speed or variable speed motor with a simple attachment mechanism to the freezer bowl 20. Mounting plate 35 is configured to provide stabilization for the freezer bowl 20 when being rotated by being wide in shape and having locking features 39. Locking features 39 hold the freezer bowl 20 down and prevent release even when a force is applied to one side of the bowl. Freezer bowl 20 also has a mating shape of mounting features 38 that with the locking features 39 to hold the bowl in place. In this embodiment the scraper 40 applies a force that is not symmetric to the freezer bowl 20 and would create an unstable condition unless the freezer bowl is held into position. It can be conceived that applying a symmetric force to the bowl could eliminate the need to have a locking feature 39 and mounting feature 38.

Figure 3:
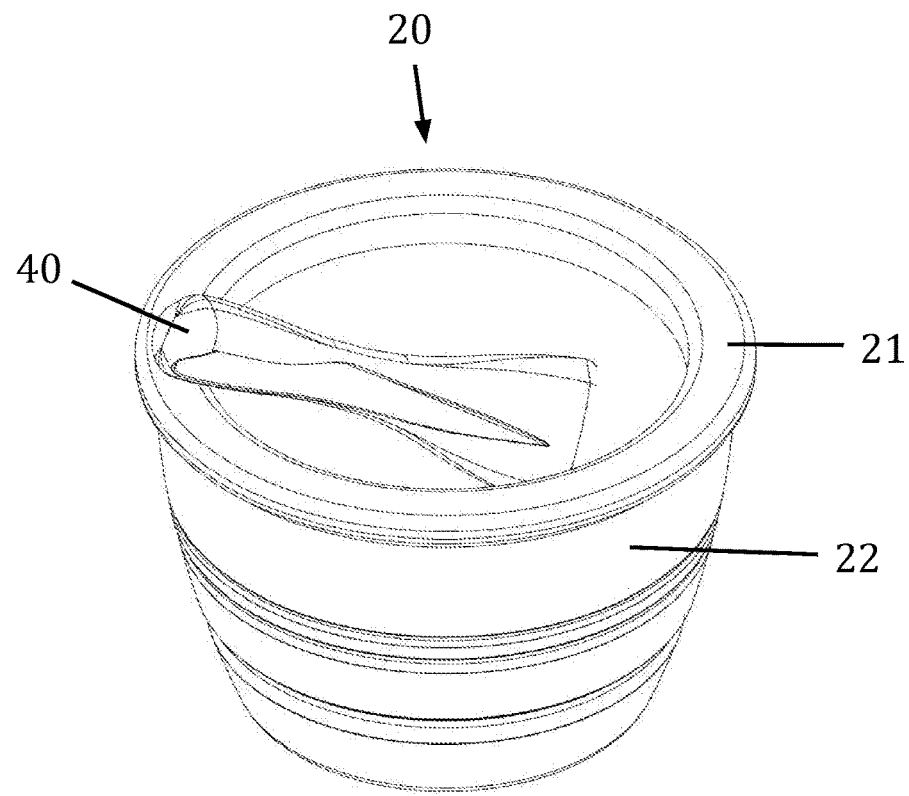
FIG. 3 is a detail view of the freezer bowl previously shown in FIG. 1 with an added scraper shown for clarity.
Figure 4:
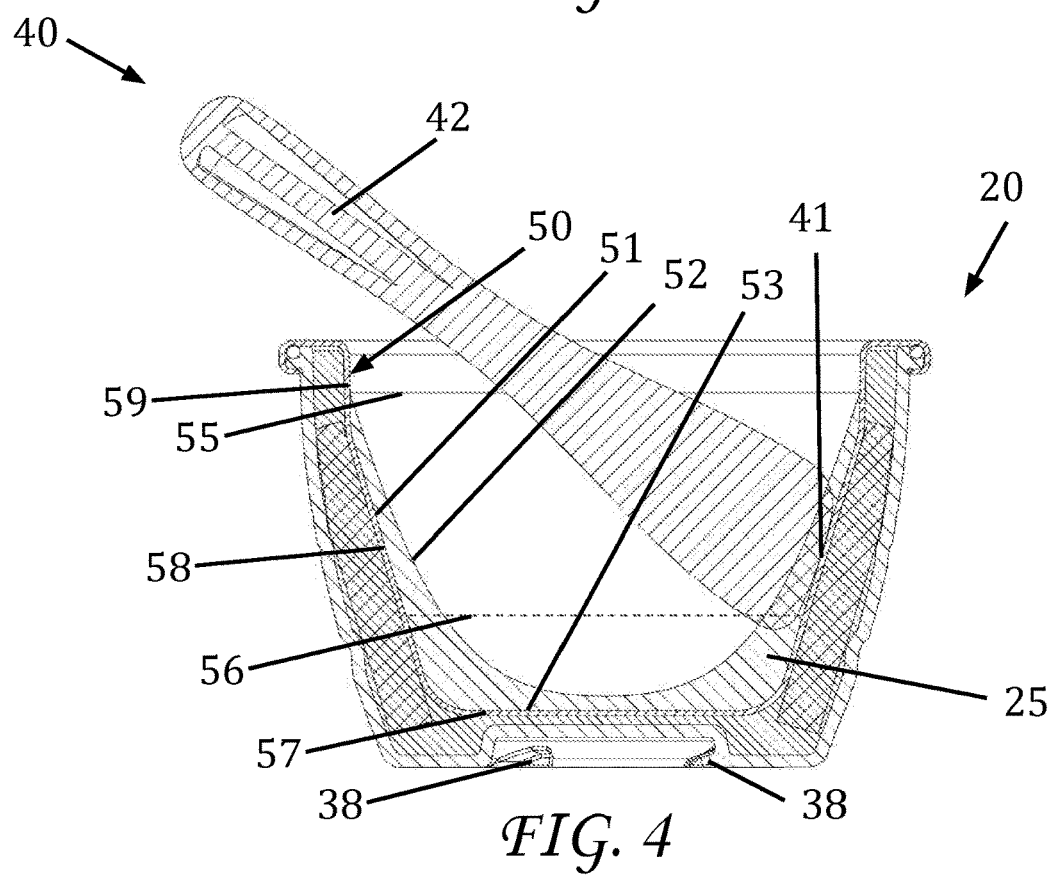
FIG. 4 is a vertical section view of the freezer bowl and scraper previously shown in FIG. 5 shown for added clarity.

In FIGS. 3 and 4, the scraper 40 is added to show one embodiment of a churning and scraping device. Scraper 40 includes a handle 42 and a scraping edge 41. Scraping edge 41 is shaped to generally follow at least a portion of the interior surface 50 so that a user could effectively scrape and churn solution 25. Furthermore, it is disclosed that scraper 40 could be fixed to the body 30 so that the user would not be required for constant attention and churning. It is also disclosed that the scraper 40 could be an actuating edge to scrape only a portion of the interior surface 50 at a time thus reducing friction and thereby the generation of heat in the freezer bowl 20. One such mechanism could be a simple spring-loaded arm oscillated vertically by a drive motor 33. Another such mechanism could be an auger shaped to match the contour of the interior surface 50 and rotate to scrape and churn the solution 25. It is easily envisioned that automating a scraper could be implemented using the existing motor 33 or by adding a supplemental motor. Automating the scraping makes the freezing process easier for the user but it also eliminates the human interaction and thereby the human judgement of how to most effectively churn the mixture and when to stop.

In FIG. 4, freezer bowl 20 has solution 25 being centrifugally dispersed on the interior surface 50 and reaching a dynamic height 55. Besides the agitation of the solution 25, the centrifugally dispersed fluid creates a generally parabolic shape on the solution surface 52 that depends on the rate at which the solution 25 is spinning. The predicted height of the solution surface 52 would be the radial distance from the center squared, times the rotational velocity in radians per second squared divided by two times the gravitational force. The calculation of the solution surface 52 is well correlated with physical data but does change with changing viscosities, surface tension and level of agitation. The maximum vertical slope of the solution surface 52 occurs at the topmost solution height or at the dynamic height 55 and at the widest radius from the center. It is disclosed that the contour of the interior surface 50 is shaped to have a minimal solution depth between the solution surface 52 and the interior surface 50 of the freezer bowl 20 when the solution is centrifugally dispersed at a desired rate. The desirable rate of rotation depends largely on the size of the freezer bowl 20. A tall, narrow freezer bowl 20 could have a desirable rate of rotation at or above 400 revolutions per minute (rpm). Whereas a large or wide interior surface 50 would be more advantageous to utilize a spinning solution going at 100 rpm or less. Because the surface profile is so predictable through the theoretical computation of the spinning fluid it can be understood that the interior surface 50 would be desirable to nearly match the calculated profile as in FIG. 5. As other design considerations are addressed, such as using straight walls for contact of heat transfer fins 23 the straight portion of the wall would be desirable to be close to the maximum predicted vertical slope of the solution surface 50.

In the embodiment shown in FIG. 4 the interior surface 50 further has a dynamic contact area 51 that the surface area that is being contacted by the solution 25 while being centrifugally dispersed. The surface of the solution at rest would then be the static surface area 53. Furthermore, the solution 25 when at rest and contained by the interior surface 50 is at a static height 56. To quantify the average solution depth, one would calculate the solution volume and divide it by the dynamic contact area 51. The smaller the average solution depth the faster the solution temperature will be reduced to allow freezing of the solution. It is disclosed that average solution depth values of less than 1.5 cm are desirable and particularly 1 cm or less have a high heat transfer from the solution 25 to aid in producing a fast and quality finished product. With a heat transfer rate matching that of a phase changing heatsink, it has been found that and average solution depth of 1.5 cm corresponds to a sufficiently fast freezing to produce the desired small ice crystals and solution texture. A lower average solution depth than 1.5 cm has been found to both decreases the time to freeze the solution and improve the desired consistency. The average solution depth is one of the most critical indicators of heat transfer performance but also having a reasonably low maximum solution 25 depth will help to improve the heat transfer and not allow deep areas for solution to remain elevated in temperature. The magnitude of the solution depth would be known as the depth below the solution surface 52 of the solution 25 in the direction perpendicular to the solution surface 52 to reach the interior surface 50. Additionally, the simple ratio of the dynamic height 55 over the static height 56 is a good indicator that the ice cream freezer 10 is taking advantage of an increased surface area for faster cooling performance. Values greater than 1.5 (or a 50% increase) are desirable and values greater than 2 (or a 100% increase) have a high heat transfer and cooling performance. Similarly, the ratio of the dynamic contact area 51 to the static contact surface 53 indicates the amount of dispersion that the solution 25 is undergoing and thus the amount of increased usage of the interior surface 50. Again, values greater than 1.5 (or a 50% increase) are desirable and values greater than 2 (or a 100% increase) have a high heat transfer and cooling performance.

Figure 5:
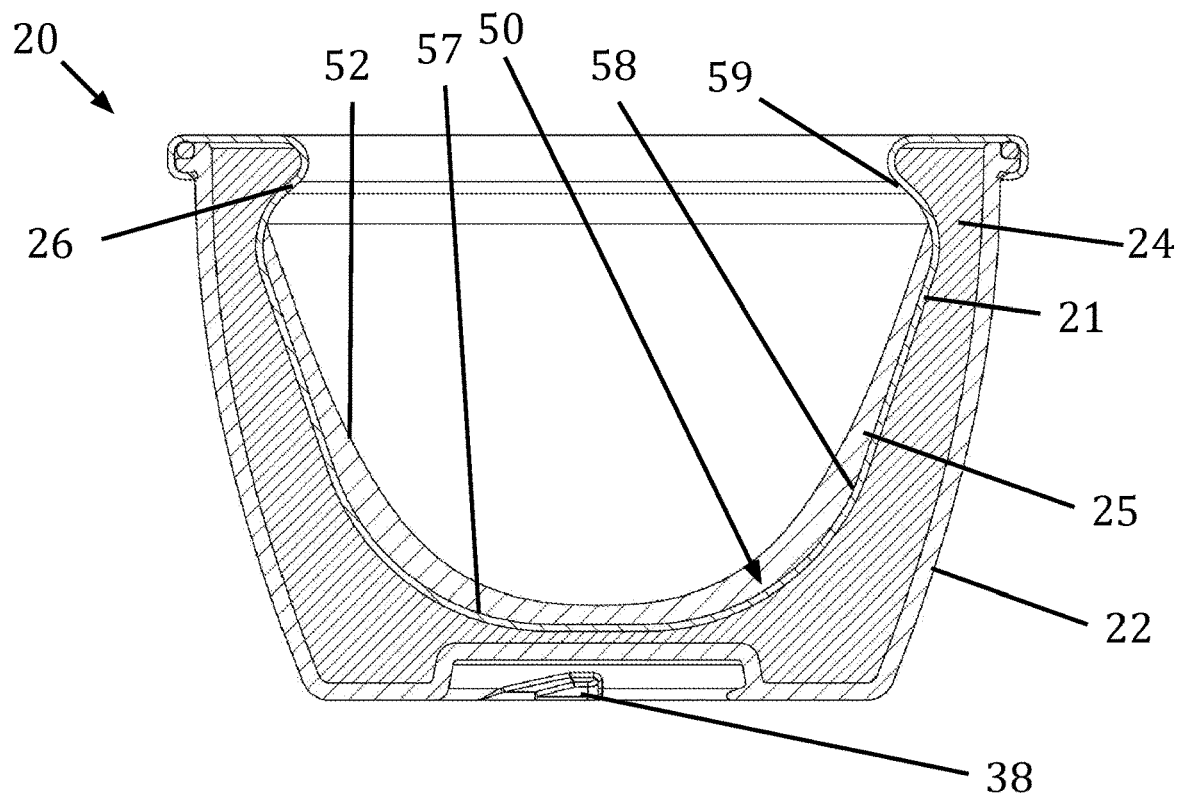
FIG. 5 is a vertical section view of the freezer bowl incorporating a second embodiment of the present invention.
Figure 6:
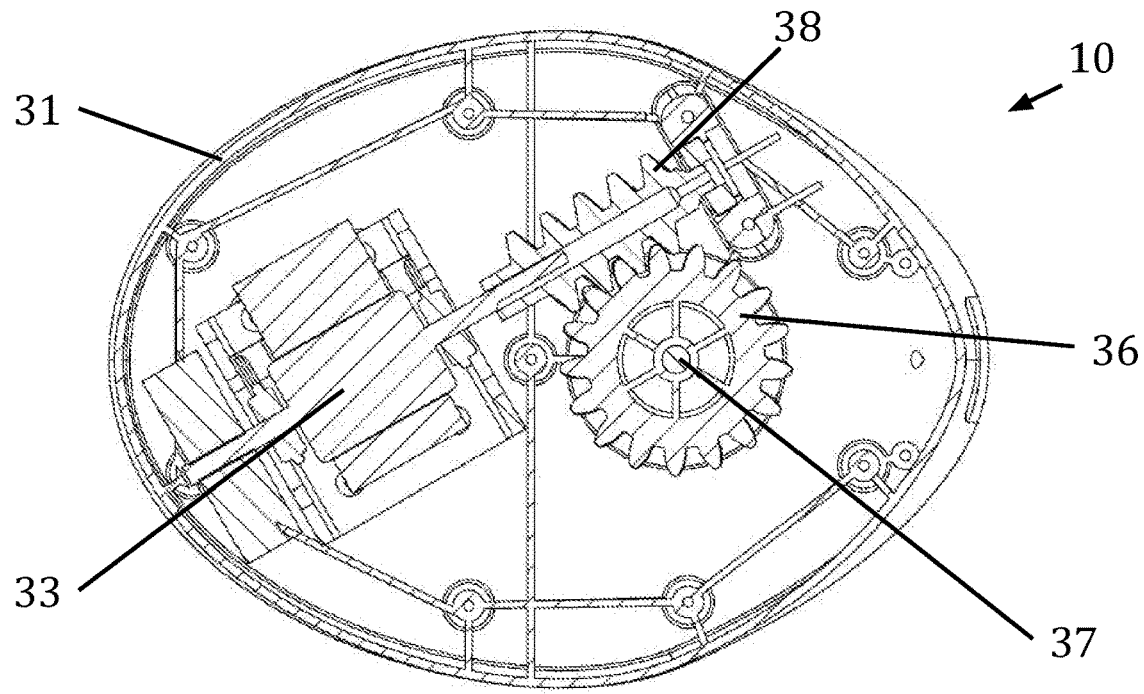
FIG. 6 is a horizontal section view of the ice cream freezer shown in FIG. 1 for added clarity of the ice cream freezer.

In the embodiment shown in FIGS. 1 through 8, the interior surface 50 is further made up of a base 57, sidewall 58 and an upper extension 59. In the embodiment shown in FIGS. 1 through 4 the sidewall 58 is upward and outward sloped and more particularly a frusto-conical shape with the base 57 being flat. The frusto-conical sidewall 58 is advantageous so that the use of corrugated aluminum fins 23 would have a large contact surface thereby improving the heat transfer through the material 21. The upper extension 59 is more inward sloped than the sidewall to improve the retention of the solution when it is centrifugally dispersed. In one embodiment of the present invention the upper extension 59 is generally vertical to consider a simple tooling by creating the part without undercut. In the embodiment shown in FIG. 5 the upper extension 59 is creating an undercut shape for greatly improving the solution 25 retention, however the tooling will become more complex or could be made with a manual forming process like spin forming or swaging. The sidewall 58 is more curved and the base 57 is somewhat curved as well. In this embodiment, the contour of the interior surface 50 is more of an ellipsoid profile and very closely matches the parabolic solution surface 52 of the surface of the solution 25 thereby more evenly freezing the solution. It can be conceived that any number of interior surface 50 contours could be made to take advantage of the increased surface with respect to the volume of solution 25. It can also be noted that the embodiment disclosed in FIGS. 4 and 5 shows the contour of the sidewall 58 having an angle that is close to the maximum vertical angle of the surface solution 52 until the upper extension 59 is more inward angle to capture the fluid. If the contour is more vertical than the maximum vertical angle of the solution surface 52 then a lager variation in solution 25 depth can occur. As described, the key factor is not solution depth variation as much as average solution depth for influencing freezing time and quality.

Figure 7:
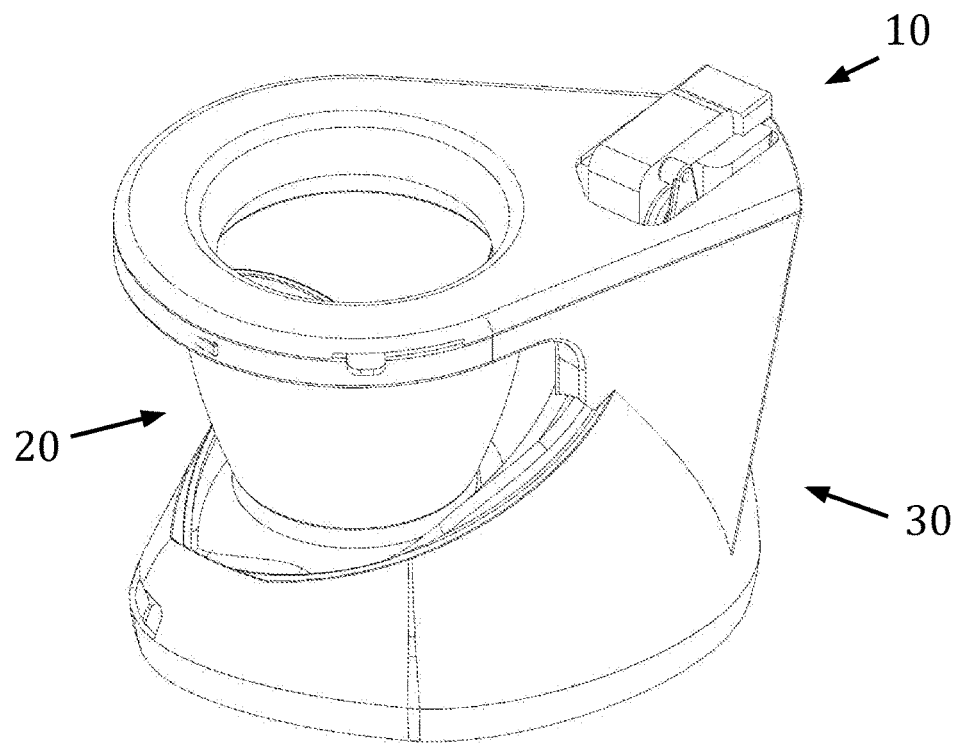
FIG. 7 is a third embodiment an ice cream freezer incorporating the principles of the present invention.
Figure 8:
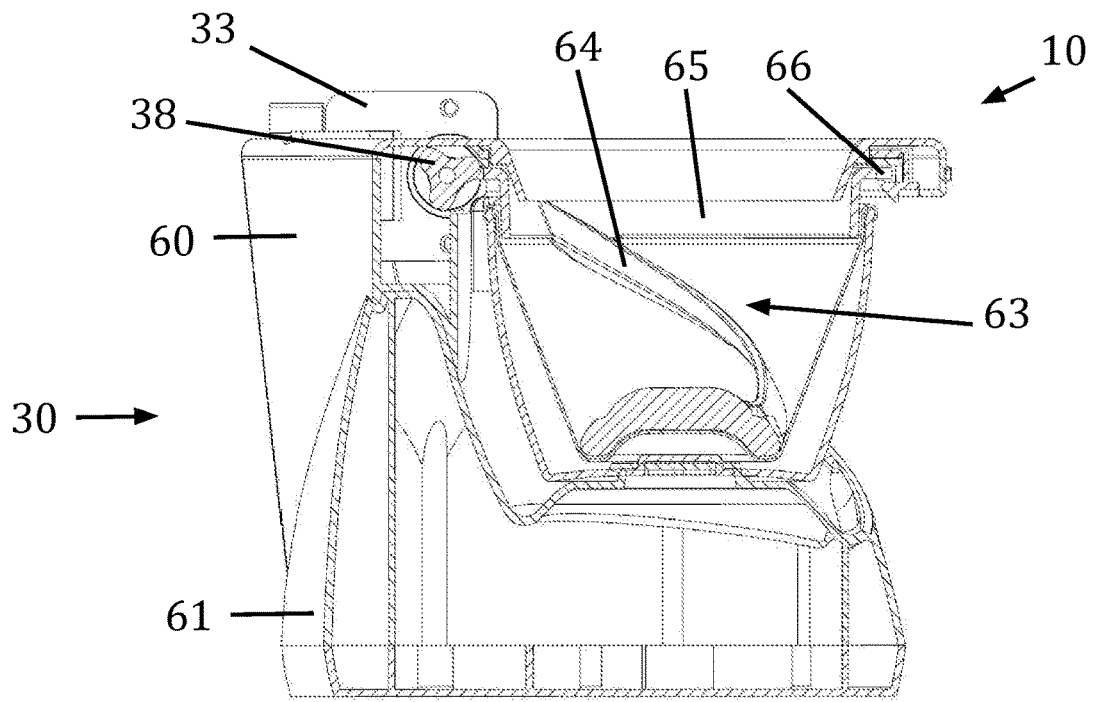
FIG. 8 is a vertical section view of the ice cream freezer previously shown in FIG. 7.

In the embodiment shown in FIGS. 7 and 8 the ice cream maker 10 is comprised of a freezer bowl 20 and a body 30. In this embodiment of the present invention, the body 30 has a top housing 60 that holds the drive motor 33. The drive motor 33 in combination with a drive mechanism rotates the dasher 63 while the freezer bowl 20 is held stationary by a bottom housing 61. Dasher 63 is made up of a blade 64 and a top structure 65. The blade 64 generally matches the interior surface 50 so that it can perform the functions of both scraping and centrifugally dispersing the solution 25. The drive mechanism, as disclosed in this embodiment, is made up of a worm gear 38 to directly rotate the dasher 63 through teeth 66 located around the top structure 65. This embodiment is a typical worm gear drive mechanism but it is understood that any number of drive mechanisms could be employed. Furthermore, it is disclosed that dasher 63 could be fixed to the body 30 and the freezer bowl 20 be rotated as described previously. It is also disclosed that the top housing 60 and the bottom housing 61 could be moving relative to one another for the purpose of maintaining the centrifugal dispersion but not scraping the solution 25 when spaced apart so as to limit the amount of friction and heat imparted to the freezer bowl 20. The drive motor 33 could include an actuator mechanism between the top housing 60 and the bottom housing 61 or a spring biasing mechanism could be used to allow the user to move the top housing 60 and bottom housing 61 apart or together.

Naturally, the invention is not limited to the foregoing embodiments, but it can also be modified in many ways without departing from the basic concepts. Changes in the details, materials, steps and arrangements of parts which have been described and illustrated to explain the nature of the invention will occur to and may be made by those skilled in the art upon a reading of this disclosure within the principles and scope of the invention. The foregoing summary illustrates the preferred embodiments of the invention; however, concepts, as based upon the description, may be employed in other embodiments without departing from the scope of the invention.

What is claimed is:

1. An ice cream making apparatus for chilling a solution, comprising:
    a freezer bowl having a thermally conductive interior surface for containing the solution, the interior surface having a contour that is substantially radially symmetric about a rotational axis, the solution covering a static contact area of the interior surface when the solution is stationary; and
    a base-supported drive mechanism for rotating the solution in the freezer bowl thereby centrifugally dispersing the solution onto a dynamic contact area of the interior surface, the ratio of the dynamic contact area to the static contact area being at least 1.5:1 to increase heat transfer from the solution to the freezer bowl.

2. The ice cream making apparatus of claim 1, wherein rotation of the solution centrifugally disperses the solution into a thin layer the thin layer an average dynamic thickness less than 1.5 centimeters.

3. The ice cream making apparatus of claim 2, wherein the contour of the interior surface has a base and a sidewall, the sidewall being upwardly and outwardly sloped.

4. The ice cream making apparatus of claim 3, wherein the sidewall is a frusto-conical shape.

5. The ice cream making apparatus of claim 4, wherein the centrifugally dispersed solution has a vertical slope relative to the rotational axis and the difference between an angle of the frusto-conical shape relative to the rotational axis and the vertical slope is less than 10 degrees.

6. The ice cream making apparatus of claim 3, wherein the sidewall is an ellipsoid profile shape.

7. The ice cream making apparatus of claim 3, wherein the contour of the interior surface further has an upper extension that extends above the sidewall and being more inward sloped than the sidewall.

8. The ice cream making apparatus of claim 7, wherein the upper extension is generally vertically oriented.

9. The ice cream making apparatus of claim 1, wherein the interior surface comprises a thermally conductive material and the freezer bowl comprises a heatsink having a thermal capacity sufficient to chill the solution to a substantially uniform temperature equal to or less than the freezing temperature of water.

10. The ice cream making apparatus of claim 9, wherein the heatsink comprises a phase changing solution.

11. The ice cream making apparatus of claim 1, wherein the freezer bowl is rotated by the drive mechanism to cause the solution to centrifugally disperse on the interior surface.

12. The ice cream making apparatus of claim 1, further comprising a scraping element adapted to scrape against at least a portion of the interior surface to separate the solution from the interior surface.

13. The ice cream making apparatus of claim 12, wherein the scraping element remains stationary in relation to the base.

14. The ice cream making apparatus of claim 12, wherein the scraping element is rotated by the drive mechanism.

15. The ice cream making apparatus of claim 14, wherein rotation of the scraping element relative to the freezer bowl centrifugally disperses the solution on the interior surface.

16. The ice cream making apparatus of claim 12, wherein the scraping element is moved vertically along the interior surface of the freezer bowl by the drive mechanism.

17. An ice cream making apparatus for chilling a volume of solution, comprising:
- a freezer bowl having a thermally conductive interior surface for containing the volume of solution, the interior surface having a base and sidewalls being upwardly and outwardly sloping and having a generally circular planar cross section area, the volume of solution covering a static contact area of the interior surface when the solution is stationary;
- a heatsink thermally coupled to the interior surface for absorbing heat from the solution; and
- a drive mechanism for rotating the solution to centrifugally disperse the solution into a thin layer covering a dynamic contact area of the interior surface to increase the rate of heat transfer from the solution to the heatsink, the thin layer having an average thickness of less than or equal to 1.5 centimeters.

18. The ice cream making apparatus of claim 17, wherein the ratio of the dynamic contact area to the static contact area is at least 1.5:1 to increase heat transfer from the solution to the heatsink.

19. The ice cream making apparatus of claim 17, wherein the heatsink comprises a phase changing solution.

20. A method of making ice cream from a solution comprising the steps of:
- providing a freezer bowl having an interior surface for containing the solution;
- providing a drive mechanism for rotating the solution in relation to the freezer bowl;
- chilling the freezer bowl to a temperature below the freezing temperature of water;
- adding the solution to the freezing bowl, the solution covering a static contact area of the interior surface when the solution is not centrifugally dispersed;
- rotating the solution in relation to the freezing bowl to centrifugally disperse the solution into a thin layer covering a dynamic contact area of the interior surface, the dynamic contact area being at least 1.5 times the static contact area;
- providing a scraper element for adapted to scrape against at least a portion of the interior surface to separate the solution from the interior surface;
- scraping with the scraper element the solution from the interior surface as the solution is rotated until the solution temperature is reduced and aerated into an ice crystal mixture of the solution; and
- removing the ice crystal mixture of the solution from the freezer bowl.

\* \* \* \* \*